United States Patent
Watabe et al.

[11] Patent Number: 5,729,258
[45] Date of Patent: Mar. 17, 1998

[54] CLEANING MEMBER USED FOR AN INK-JET RECORDING APPARATUS AND THE INK-JET RECORDING APPARATUS USING THE AFORESAID CLEANING MEMBER

[75] Inventors: Masahiro Watabe; Noriyuki Yanai, both of Yokohama, Japan

[73] Assignee: Canon Kabushiki Kaisha, Tokyo, Japan

[21] Appl. No.: 389,627

[22] Filed: Feb. 15, 1995

Related U.S. Application Data

[63] Continuation of Ser. No. 757,481, Sep. 10, 1991, abandoned.

[30] Foreign Application Priority Data

| Sep. 14, 1990 | [JP] | Japan | 2-242532 |
| Jan. 18, 1991 | [JP] | Japan | 3-004385 |
| Aug. 22, 1991 | [JP] | Japan | 3-210571 |

[51] Int. Cl.$^6$ ................................ B41J 2/165
[52] U.S. Cl. ................ 347/33; 528/45; 528/65; 528/121
[58] Field of Search ............ 347/22, 33, 122, 347/100; 15/256.5, 256.51, 256.52; 523/436; 528/45, 65, 73, 83, 85, 121, 122

[56] References Cited

U.S. PATENT DOCUMENTS

| 3,723,392 | 3/1973 | Konig et al. | |
| 4,313,124 | 1/1982 | Hara | 347/57 |
| 4,345,262 | 8/1982 | Shirato et al. | 347/10 |
| 4,435,558 | 3/1984 | Burba et al. | 528/45 |
| 4,459,600 | 7/1984 | Sato et al. | 347/47 |
| 4,463,359 | 7/1984 | Ayata et al. | 347/56 |
| 4,546,044 | 10/1985 | Asano et al. | 428/413 |
| 4,558,333 | 12/1985 | Sugitani et al. | 347/65 |
| 4,670,485 | 6/1987 | Hesse et al. | 523/436 |
| 4,723,129 | 2/1988 | Endo et al. | 347/56 |
| 4,740,796 | 4/1988 | Endo et al. | 347/56 |
| 5,005,024 | 4/1991 | Takahashi et al. | 346/140 R X |
| 5,040,030 | 8/1991 | Ziegelmuller | 15/256.51 X |
| 5,126,765 | 6/1992 | Nakamura | 346/140 R |

FOREIGN PATENT DOCUMENTS

| 383019 | 8/1990 | European Pat. Off. |
| 135245 | 8/1984 | United Kingdom. |

OTHER PUBLICATIONS

Patent Abstracts of Japan, vol. 3, No. 138 (C-64), Nov. 16, 1979; and JP-A-54116091 (Unitika K.K.) Oct. 9, 1979.
Patent Abstracts of Japan, vol. II, No. 318 (M-632) (2765), Oct. 16, 1987; and JP-A-62101447 (Canon) May 11, 1987.
Patent Abstracts of Japan, vol. 12, No. 171 (M-700) (3018), May 21, 1988; and JP-A-62288047 (Canon) Dec. 14, 1987.

*Primary Examiner*—John E. Barlow, Jr.
*Attorney, Agent, or Firm*—Fitzpatrick, Cella, Harper & Scinto

[57] ABSTRACT

A cleaning member which is a cleaning blade for cleaning the discharging port formation surface of the ink jet recording head for an ink jet recording apparatus includes polyether polyurethane obtainable by the reaction between a hardening agent and the polyether urethane prepolymer which is obtained by the reaction between polyoxyalkyleneglycol and polyisocyanate, and an ink jet recording apparatus which uses the aforesaid cleaning blade enables a desirable image to be obtained for a long time without replacing cleaning blades.

11 Claims, 5 Drawing Sheets

F I G. 3
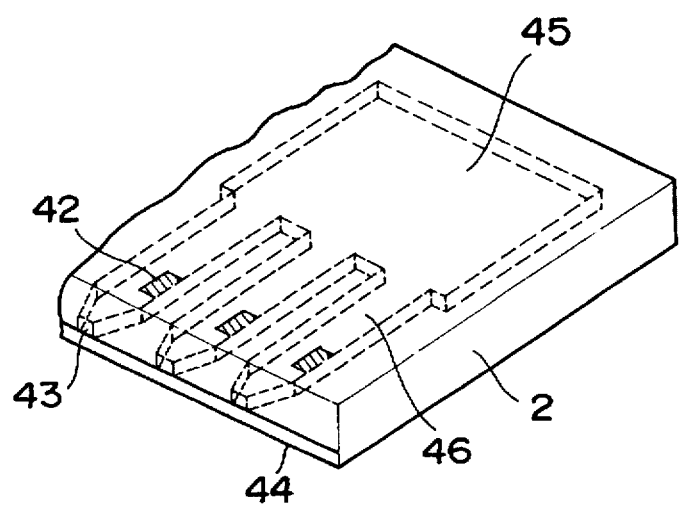

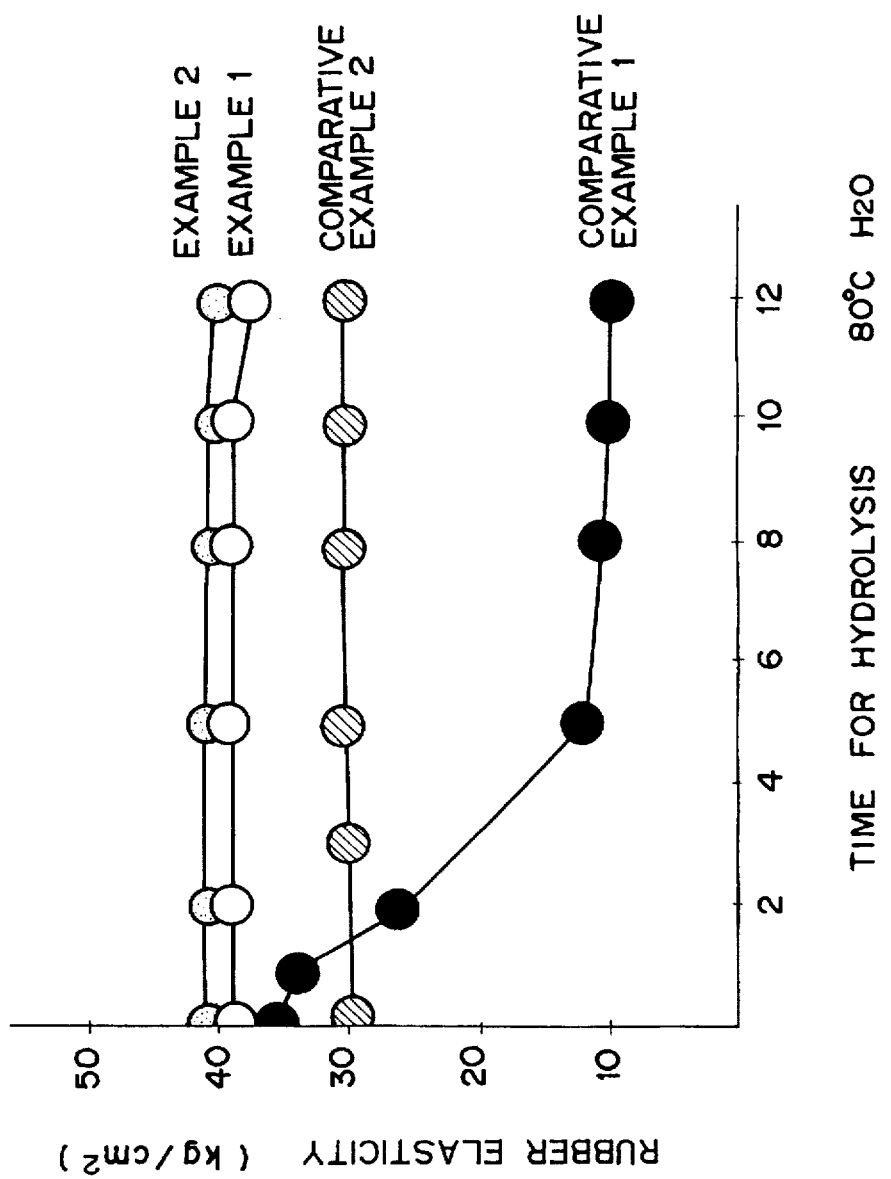

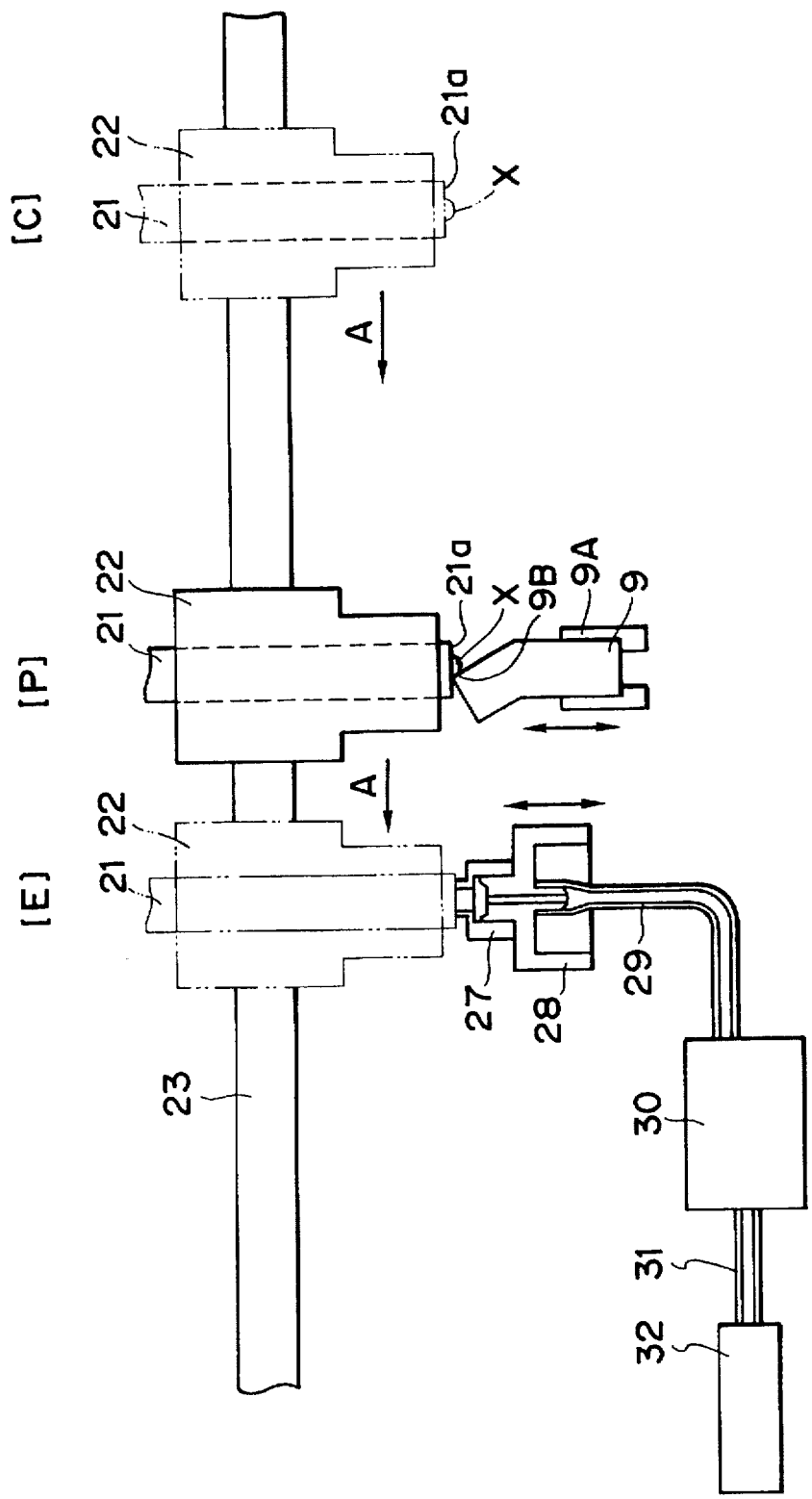

CLEANING MEMBER USED FOR AN INK-JET RECORDING APPARATUS AND THE INK-JET RECORDING APPARATUS USING THE AFORESAID CLEANING MEMBER

This application is a continuation of application Ser. No. 07/757,481 filed Sep. 10, 1991, now abandoned.

BACKGROUND OF THE INVENTION

1. Field of the Invention

The present invention relates to a cleaning member used for cleaning the adhesive particles adhering to the recording head of an ink jet recording apparatus and the ink jet recording apparatus which uses the aforesaid cleaning member.

2. Related Background Art

Traditionally, in the ink jet recording apparatus which uses the ink jet recording head for performing the recording by discharging ink, there has been problem set forth below in regard to the ink jet recording head. In other words, adhesive particles, such as dirt, dust, paper, powder, or ink droplet, adhere to the discharging surface of the recording head of an ink jet recording apparatus, which discharges finely liquefied ink, to make the flying path of the ink droplet unstable or cause the ink discharging port to be stuffed by the adhesive particles which have been dried. Thus, there is a possibility that the ink discharging is disabled. As one of the methods of solving the above-mentioned problem, a blade cleaning method is employed by the use of a blade made of a resilient cleaning member. Hereinafter, using FIG. 1, the description will be made of the blade cleaning method. A main scanning carriage 22 having the ink jet recording head 21 located in the position (C) in FIG. 1 is moved on a guide shaft 23. Also, a cleaning blade made of a resilient cleaning member 24 is arranged at a position to be in contact with the discharging surface 21a of the recording head 21. A reference numeral 25 designates a supporting member for fixing the cleaning blade 24. When the main scanning carriage 22 is moved in the direction indicated by arrow A to pass through the position (P), the cleaning blade 24 slidably rubs the discharging surface 21a to remove the adhesive particle X such as ink droplet, paper, powder, dust from the discharging surface 21a making use of the edge of the cleaning blade 24. As compared with the cleaning method thereby to such ink by allowing an ink absorbent to be in contact with the discharging surface 21a, this method has an advantage that its structure can be made simple because there is no need of any structure which is required for recovering the cleaning capability of the absorbent to collect ink and others.

Traditionally, however, there are problems set forth below respectively for silicone rubber and polyester urethane rubber used as the resilient member of the above-mentioned cleaning method. In other words, the silicone rubber is weak in friction resistivity, and the wearing of the silicone rubber is generated by slidably rubbing the head, making it impossible to perform a sufficient cleaning of the discharging surface 21a eventually, leading to the possibility that defective images result from the unstable flying path of the ink droplet as well as from the stuffing of the nozzle of the head caused by the powdered particles generated by the friction.

Also, in the case where an inorganic filler such as silica is compounded with the silicone rubber, this composition causes the vicinity of the nozzle of the head to be damaged to make the flying path of the ink droplet unstable, leading to the possibility of the defective image generation. Further, there is a possibility that the oil component contained in the silicone rubber decomposes ink to generate the defective image. Furthermore, if the silicone rubber blade is used for cleaning the nozzle of the ink jet system wherein the ink droplet is discharged from the discharging element utilizing the thermal energy for performing the recording the oil component contained in silicone rubber is ingressed into the ink discharging nozzle portion, and this oil component is siezed onto the thermal generator to disable the ink discharging. Accordingly, by this the defective image may result in some cases.

Also, the polyester urethane rubber tends to generate water resolution due to its composition, and if this rubber is used for a long time, its elasticity is deteriorated by the water content in the air or water component in ink to cause more friction which hinders sufficient cleaning, thus leading to the possibility of the defective image generation. Further, if ink is acidic or alkaline, the deterioration of the polyester urethane rubber progress much quicker. Therefore, it is necessary to replace the polyester urethane rubber blade periodically if this is used as the cleaning member.

SUMMARY OF THE INVENTION

An object of the present invention is to provide a cleaning member capable of allowing a desirable image to be obtained for a long time and an ink jet recording apparatus using the aforesaid cleaning member.

Another object of the present invention is to provide a cleaning member having an excellent capability to clean the recording head and an ink jet recording apparatus using the aforesaid cleaning member.

Still another object of the present invention is to provide a cleaning member having an excellent antifriction-ability to enable the reduction of its replacement frequency substantially and an ink jet recording apparatus using the aforesaid cleaning member.

A further object of the present invention is to provide a cleaning blade as the cleaning member for an ink jet recording apparatus capable of allowing a desirable image to be obtained semipermanently by the use of the resilient material having an excellent antiwater content solution and antifriction for the cleaning blade member for eliminating the replacement of the cleaning blade as well as the causes of generating the defective image due to the inorganic filler and oil content, and the ink jet recording apparatus.

Still a further object of the present invention is to provide a cleaning member for an ink jet recording apparatus wherein the cleaning member for the ink jet recording apparatus is made of a resilient rubber, and the aforesaid cleaning member is constructed to include polyether polyurethane.

BRIEF DESCRIPTION OF THE DRAWINGS

FIG. 3 is a perspective view showing an example of the ink jet recording head;

FIG. 4 is a graph showing the water resistivity of the cleaning blade; and

FIG. 5 is an enlargement of the principal part of the ink jet recording apparatus to which the blade cleaning method is applied.

DETAILED DESCRIPTION OF THE PREFERRED EMBODIMENTS

Hereinafter, in reference to the accompanying drawings the embodiments suited for the present invention will be described.

The embodiments set forth below relate to the cleaning blade which is a cleaning member for cleaning the adhesive particles adhering to the recording head of an ink jet recording apparatus as well as to the ink jet recording apparatus.

Figure 1:
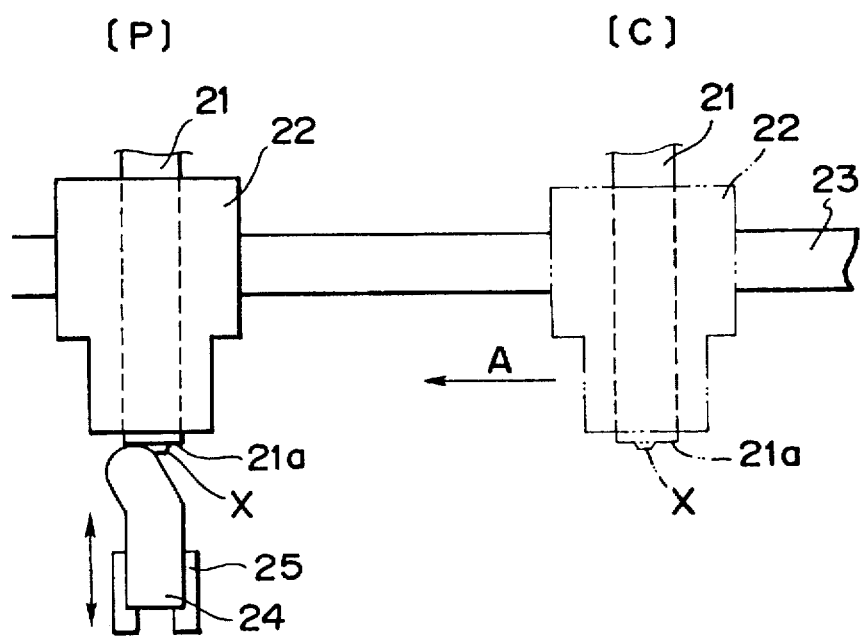
FIG. 1 is a view illustrating the contacting relationship between the cleaning blade for an ink jet recording apparatus and the ink jet head, and the head capping.
Figure 2:
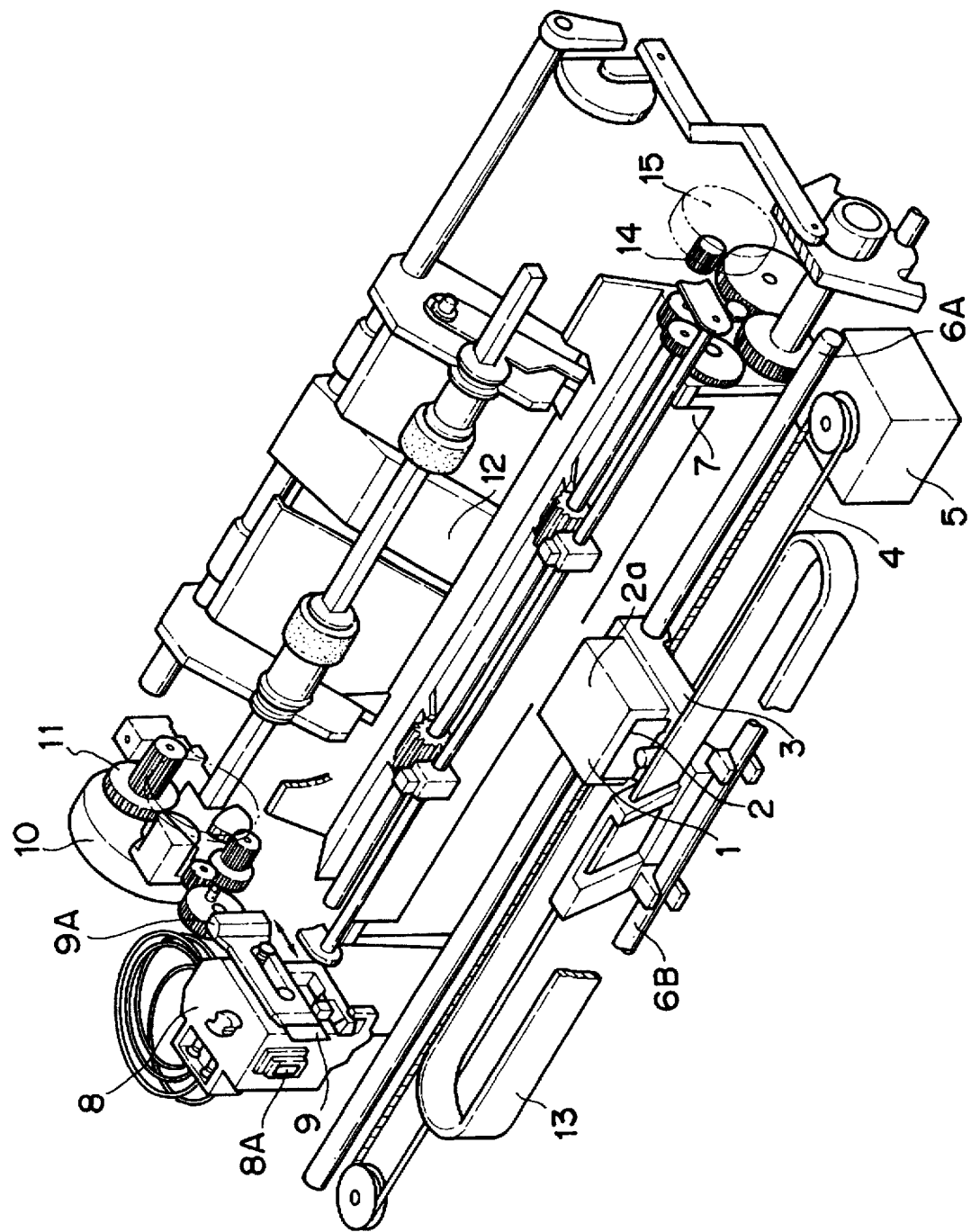
FIG. 2 is a perspective view showing an embodiment of the cleaning member and the ink jet recording apparatus using the aforesaid cleaning member suited for the present invention.

As shown in FIG. 2, the ink jet recording apparatus, to which the embodiment according to the present invention is applied, is an ink jet recording apparatus wherein an ink jet head cartridge 1 having an ink jet recording head 2 and ink tank 2a integrally built is attachably to or detachably from a carriage 3. This carriage 3 is coupled to a part of a driving belt 4 for transmitting the driving power of a motor 5, and is slidably mounted on two guide shafts 6A and 6B arranged in parallel. Then, by the driving power of the driving motor 5, the aforesaid ink jet head 2 is shuttled over the entire width of a recording paper to perform the recording onto the recording paper.

In this respect, a reference numeral 7 designates a platen arranged facing the discharging surface of the recording head 2 to maintain the recording paper, which is conveyed by a conveying means 12, at a recording position in a predetermined space with the recording head.

Also, in the ink jet recording apparatus according to the present embodiment, there is provided a head recovery unit 8 in an area outside the region where the recording head 2 shuttles to perform the recording at a position to which the ink jet recording head 2 can be moved for its head recovery operation (at the left end side of the guide shaft 6A in FIG. 2. Hereinafter referred to as recovery position). This head recovery unit 8 is driven by a driving motor 10 for the cleaning operation through a transmission mechanism 11 and is provided with a cap member 8A for capping the discharging surface of the aforesaid ink jet recording head 2.

This head recovery unit 8 performs ink suction by a suction means (not shown) or compressed supply of ink to the head 2 by a compression means (not shown) arranged in the ink supply path in a state where the cap member 8A caps the discharging surface of the recording head 2 at the time of the head recovery operation. Thus, ink is forcibly exhausted from the discharging port to perform the removal of the overly viscous ink and others related to the head recovery operation.

Further, at the side face of the head recovery unit 8, the blade 9 which is formed by a material including polyether polyurethane according to the present invention is supported as the cleaning member by a blade supporting member 9A in a cantilever fashion. Then, this blade 9 is driven by the motor 10 for the cleaning operation and the transmission mechanism 11 as in the case of the head recovery unit 8 to move between the cleaning position and non-cleaning position, and at the aforesaid cleaning position, the recording head 2 is allowed to couple with the recording head 2. In this way, subsequent to the head recovery operation using the head recovery unit 8, the blade 9 which is the cleaning member is projected into the traveling path (cleaning position) of the recording head 2 to wipe the dew condensation, the wet, the dust particles, and others accompanying the movement of the recording head 2.

The above-mentioned ink jet recording apparatus receives in its printing control unit the documentary data, control commands, and others inputted from the input unit such as key board, and performs a series of recording operations of the aforesaid documentary data, the aforesaid head recovery operation, and other related operations. In this respect, a reference numeral 13 designates a flexible cable; 14, drive transmission system for the conveying means 12, which is driven by the driving force of the motor 15.

Furthermore, the aforesaid recording head 2 discharges ink by the utilization of thermal energy, and as shown in FIG. 3, the discharging ports 43 each provided with the electrothermal converters 42 as discharging control element to give the thermal energy are arranged in parallel in the discharging face opposite to the recording paper. Here, a reference numeral 44 designates a substrate; 45, a common liquid chamber; and 46, a liquid path.

Now, in FIG. 5, an enlargement of the principal part of the ink jet recording apparatus, to which the blade cleaning method is applicable, is shown.

A main scanning carriage 22 having the ink jet recording head 21 located in the position (C) in FIG. 5 is moved on a guide shaft 23. Also, a cleaning blade made of a resilient cleaning member 9 formed by a material including the polyether polyurethane according to the present invention arranged at a position to be in contact with the discharging surface 21a of the recording head 21. A reference numeral 9A designates a supporting member for fixing the cleaning blade 24. When the main scanning carriage 22 is moved in the direction indicated by arrow A to pass through the position (P), the cleaning blade 24 slidably rubs the discharging surface 21a to remove the adhesive particle X such as ink droplet, paper, powder, dust from the discharging surface 21a making use of the rectangular edge 9B of the cleaning blade 9.

In this respect, the cleaning blade 24 and the supporting member 25 are structured to be movable by a driving means (not shown) between the position to be in contact with the discharging surface 21a of the ink jet recording head 21 (cleaning position) and the position not to be in contact therewith (non-cleaning position) as required.

Subsequently, when the ink jet recording head 21 is not engaged in recording, the carriage 22 is further moved in the direction indicated by arrow A to reach the position (E) (the position indicated by two-dot chain lines in FIG. 5). At this position where the recording is at rest, a rubber cap 27 and its holder 28 are arranged to shield the circumference of the discharging port from the atmosphere by closely contacting with the discharging surface 21a in order to prevent the stuffing of the discharging port by the dried ink on the discharging surface 21a of the ink jet recording head 21. Further, a tube 29 is arranged to connect a holder 28 and a suction pump 30. Then, the suction pump 30 is driven to recover the stuffing of the discharging port of the ink jet recording head 21 as required. The waste ink collected by the suction of this pump 30 is exhausted to a waste ink processing member 32 through a tube 31. Also, the rubber cap 27 and its holder 28 are driven by a driving means (not shown) to move between the position to be in contact with the discharging port 21a of the ink jet recording head 21 for shielding the circumference of the discharging port form the atmosphere (the capping position) and the non-capping position.

In the above-mentioned ink jet recording apparatus structured such as this, the cleaning blade 9 made of the aforesaid cleaning material includes polyether polyurethane as described earlier. The aforesaid polyether polyurethane is obtainable by the reaction between the known polyether urethane prepolymer obtained by the reaction of polyoxyalkyleneglycol and polyisocyanate and known hardening agent.

As the polyether urethane prepolymer, there is a polyether urethane prepolymer which is obtainable by the reaction between polyisocyanate and polyoxytetramethyleneglycol (hereinafter abbreviated as PTMEG) which is generally expressed as

$HO(CH_2CH_2CH_2CH_2O)_nH$

Then, among those available on the market, there are Azipren M483, M400, M467, LW520, and LW570 (manufactured by Du Pont), Biprasen B625, B635, B821, B836, and B670 (Uni Royal) Nipporan C4362 (Nippon Polyurethane Kogyo). As regards the other polyether urethane prepolymer, there is a polyether urethane prepolymer which is obtainable by the reaction between polyisocyanate and polyoxypropyleneglycol (hereinafter abbreviated as PPG) which is generally expressed as

$HO(CH_2CH_2CH_2O)_nH$

Then, among those available on the market, there are cited Biprasen B843 (Uni Royal), and others, but those available are not limited thereto.

In this respect, the isocyanate which should be reacted upon the polyol is not necessarily limited for the purpose, and the isocyanate traditionally in use for the polyurethane manufacturing can be used. For example, diphenylmethane diisocyanate, tolylene diisocyanate, hexamethylene diisocyanate, naphthalene diisocyanate, lithium diphenylmethane diisocyanate, and others can be cited.

Also, as the hardening agent for the above-mentioned polyether urethane prepolymer, the urethane hardener generally in use can be employed such as given below. 1,4-butanediol, 1,6-hexanediol, ethyleneglycol, propyleneglycol, polyethyleneglycol, hydroquinone diethylolether, bisphenol A, trimethylolpropane, trimethylolethane, and others.

Further, in manufacturing the cleaning blade which is the cleaning member to which the present embodiment is applicable, the above-mentioned polyurethane prepolymer which has been heated to 60° C.–100° C. in advance and the hardening agent are measured to obtain the predetermined volume respectively, and agitatedly mixed. Subsequently, if required, the mixture is defoamed and is injected into a metal mold or centrifugal molding machine for the thermal hardening process at 100° C.–140° C. Thus, the polyether polyurethane rubber cleaning blade to which the present embodiment of the present invention is obtained.

In this case, it is possible to design the properties of the polyether polyurethane to be manufactured arbitrarily by selecting appropriately the molecular weight and structure of polyol, the molecular structure of polyisocyanate, the kind of hardening agent and mix proportion, and others. Now, in the present invention, it is desirable to make the hardness of the molded polyether urethane rubber JIS A hardness 30–80 degrees in consideration of the cleaning requirements of the liquid ink or more preferably, 35–80 degrees. In other words, in manufacturing the blade with the resilient body of the molded polyether urethane rubber, there is some case where the blade is too soft to remove the adhesive particles fixed to the discharging face of the head sufficiently if the hardness of the blade is less than JIS A hardness 30 degrees. Also, if the JIS A hardness of the blade exceeds 80 degrees, there is some case where the ink adhering to the discharging face can hardly be removed. The polyether urethane thus produced to maintain the JIS A hardness of 30–80 degrees should be chemically stable, and rarely changes its properties for a long time even if in contact with water of 5–9 pH, for example.

(Embodiments)

Hereinafter, in accordance with the embodiments, the specific description of the present invention will be made in detail.

Embodiment 1

| | |
|---|---|
| Polyether urethane prepolymer (Uni Royal: Biprasen B625) | 100 weight unit |
| Hardening agent | |
| 1,4-butanediol | 4.0 weight unit |
| Trimethylolpropane | 2.2 weight unit |

With the thermally dissolved urethane prepolymer, the hardening agents, 1,4-butanediol and trimethylolpropane are mixed, and injected into a centrifugal molding machine which has been heated to 130° C. preliminarily for thermal hardening. Then, the molded compound is cut into a predetermined dimension to produce the polyether urethane blade of JIS A hardness 66 degrees.

Embodiment 2

| | |
|---|---|
| Polyether urethane prepolymer (Uni Royal: Biprasen B643) | 100 weight unit |
| Hardening agent | |
| 1,4-butanediol | 6.3 weight unit |
| Trimethylolpropane | 3.3 weight unit |

With the thermally dissolved urethane prepolymer, the hardening agents, 1,4-butanediol and trimethylolpropane are mixed and injected into a metal mold which has been heated to 130° C. preliminarily for thermal hardening. Then, the molded compound is cut into a predetermined dimension to produce the polyether urethane blade of JIS A hardness 70 degrees.

Comparative Example 1

| | |
|---|---|
| Polyester urethane prepolymer (Uni Royal: Biprasen 6020) | 100 weight unit |
| Hardening agent | |
| 1,4-butanediol | 4.2 weight unit |
| Trimethylolpropane | 2.2 weight unit |

With the thermally dissolved urethane prepolymer, the hardening agents, 1,4-butanediol and trimethylolpropane are mixed, and injected into a centrifugal molding machine which has been heated to 130° C. preliminarily for thermal hardening. Then, the molded compound is cut into a predetermined dimension to produce the polyester urethane blade of JIS A hardness 65 degrees.

Comparative Example 2

| HTV silicone material (TORE Silicone: SH861U) | 100 weight unit |
| --- | --- |
| Hardening agent (TORE Silicone: RC4) | 2 weight unit |

As for a silicone material, the hardening agent is equivalently mixed. Then, the compound is press molded with a metal mold, and cut into a predetermined dimension to produce a silicone rubber cleaning blade of JIS A hardness 60 degrees.

Each cleaning blade manufactured as set forth above, which is a cleaning member for the ink jet recording apparatus, is evaluated with respect to its water resistivity against water color ink. The result thereof is shown in FIG. 4. Also, the ink cleaning characteristics of each cleaning blade and its durability is evaluated using the ink jet recording apparatus (Canon BJC-440 Printer) to which the ink jet recording method thereby to discharge ink by the utilization of thermal energy is applied. The result is shown in the table given below.

At this juncture, the linear pressure of the cleaning blade to the ink jet head is 5 g/cm.

In this respect, as shown in FIG. 4, a hydrolysis is attempted at 80° C. $H_2O$ with the result that whereas the embodiment 1 and embodiment 2 to which the present invention is applied do not show any deterioration even after 12 days, the comparative example 1 has deteriorated and the lowering of its rubber elasticity is observed.

|  | Embodiments 1 and 2 | Comparative example 1 | Comparative example 2 |
| --- | --- | --- | --- |
| Cleaning characteristics | Printing 200,000 sheets no abnormality observed | Printing 200,000 sheets no abnormality observed | Printing 20,000 sheets defective cleaning observed |
| Cleaning characteristics subsequent to the hydrolysis *1 | Pringing 200,000 sheets no abnormality observed | Defective cleaning observed instantaneously | Printing 20,000 sheets defective cleaning observed |
| Damage given to head | O *3 | O | X |
| Decomposing effect to ink *2 | O | O | X |

*1: A sample for which the hydrolysis has been given for 10 days at 80° C. is used.
*2: The ink decomposition test is executed in such a manner that the blade sample is left in the ink (pH 7.4) for BJC-440 for a period of 90 days, and the composition of the ink at the initiation of the test and its decomposition is evaluated by analyzing the ink composition by a gas chromatography (Shimazu: GC-9A).
*3: Subsequent to having printed 200,000 sheets, the recording head is observed by a microscope with the result that only a slight damage which does not produce any adverse effect on the recording is recognized.

As clear from the above-mentioned results, the cleaning blade member for the ink jet recording apparatus, to which the embodiment of the present invention is applied, does not show any deterioration in its properties due to water and ink, or any abrasion after the printing of 200,000 sheets, thus obtaining a desirable image.

On the other hand, the cleaning blade of the comparative example 1 made of the polyester urethane which does not include the polyether urethane is low in antihydrolysis and shows the significant lowering of its rubber elasticity. With this blade having the deteriorated rubber property, the cleaning is performed, the abrasion is generated immediately to cause defective printing. In the case of the comparative example 2, which is a silicone rubber cleaning blade having no polyether urethane contained therein, the defective cleaning has also resulted due to abrasion when 20,000 sheets are printed, and the generation of defective image is observed with this blade for cleaning.

According to the cleaning blade for the ink jet recording apparatus, to which the aforesaid embodiment is applied, no powdered particle is generated by abrasion due to its sliding rub, and no ink head nozzle is stuffed thereby to cause defective function. Also, no inorganic filler or the like is added with the result that the ink jet head is not damaged. Furthermore, it is possible to maintain a desirable image for a long time because no oil component is contained to enable the prevention of the ink decomposition and oil seizure. In addition, the lowering of the rubber property due to the hydrolysis by water and ink is significantly reduced. Therefore, the abrasion of the cleaning blade which is the cleaning member is not generated even for a long time use, and there is a feature that a desirable image can be obtained semipermanently without replacing the cleaning blade.

In this respect, the present invention is particularly effective for the use in the recording head and recording apparatus of the type wherein the ink jet recording method is employed to perform the recording by forming the flying droplet by the utilization of thermal energy.

For the typical structure and principle of the abovementioned recording head and recording apparatus, it is desirable to employ for the implementation thereof the fundamental principle disclosed, for example, in the specifications of U.S. Pat. No. 4,723,129 and U.S. Pat. No. 4,740,796. This method is applicable to either so-called on demand type and continuous type. Particularly, in the case of the on demand type, at least one driving signal, which gives a recording liquid (ink) a rapid temperature rise exceeding the nuclear boiling, is applied in response to the recording information provided for the electrothermal converter arranged with respect to a sheet or liquid path holding a recording liquid, thereby causing the electrothermal converter to generate thermal energy. Hence, film boiling is generated on the thermoactive plane of the recording head, resulting in the formation of bubble in the recording liquid one to one in response to this driving signal efficiently. The recording liquid is discharged into the atmosphere through the discharging port by the active force generated in the course of the growth and contraction of this bubble to form at least one droplet. It is more desirable to produce this driving signal in the form of pulses. Then, the growth and contraction of the bubble is appropriately performed instantaneously to implement the discharging of recording liquid having particularly excellent responsivility. For this pulse type driving signal, the one such as disclosed in the specifications of U.S. Pat. No. 4,463,359 and U.S. Pat. No. 4,345,262 is suitable. In this respect, if the condition disclosed in the specification of U.S. Pat. No. 4,313,124 concerning the invention as regards the temperature rise on the above-mentioned thermoactive plane, it is possible to perform an excellent recording in a better condition.

As the structure of the recording head, the present invention includes a combination of the discharging port, liquid path, electrothermal converter (linear liquid path or rectangular liquid path) such as disclosed in each of the abovementioned specifications as well as the structure having the thermoactive portion arranged in the bending region using the configuration disclosed in the specifications of U.S. Pat. No. 4,558,333 and U.S. Pat. No. 4,459,600.

Further, as a recording head of the full-line type having a length corresponding to the width of the maximum recording medium on which the recording apparatus can perform the recording, there is a type structured to satisfy such length by the combination of a plurality of recording heads disclosed in the above-mentioned specifications or by one recording head integrally structured for the purpose. In either structure, the cleaning blade of the present invention can display its effectiveness more prominently by allowing the cleaning blade to move along the fixed discharging surface of the recording head of the full-line type.

In addition, the present invention is effective in using a freely replaceable chip type recording head for which the electrical connection to the main body of the recording apparatus and ink supply become possible when it is installed therein, or a cartridge type recording head having the ink tank integrally provided for the recording head itself.

Also, it is desirable to add a preliminarily auxiliary means to the recording head which is provided as a constituent of the recording apparatus according to the present invention because with such additional provision the effect of the present invention becomes more stable. To mention specifically, these are a heating element for preliminarily heating the recording head aside from the electrothermal converter or a preliminary heating means formed by the combination thereof, or a preliminary discharging means enabling the discharging port to discharge ink aside from the regular discharging for the recording. The provision of these preliminary means are effective in performing a stable recording.

Further, as a recording mode of the recording apparatus, the present invention is extremely effective in a recording apparatus not only for one principle color such as black but for the recording apparatus provided with at least one of the compound colors of the full-colors by color mixture irrespective of whether such recording apparatus is structured by an integration of the recording heads or by the combination of plural heads.

Furthermore, in the aforesaid embodiments, the descriptions are made of the ink as a liquid, but the ink which is solidified at room temperature or less can also be used if such ink is liquefied at the time of giving the recording signal.

Further, in addition, as the mode of the ink jet recording apparatus using the ink jet recording head according to the present invention, there may be those used for copying machines in combination with recording apparatuses, and facsimile apparatuses having transmitter and receiver, or the like besides the image output terminals for a computer or other information processing apparatuses.

With the present invention as set forth above, it is possible to provide the cleaning member enabling a desirable image to be obtained for a long time and the ink jet recording apparatus using the aforesaid cleaning member.

What is claimed is:

1. An ink jet recording apparatus for recording by discharging ink from a discharging surface of an ink jet recording means onto a recording medium, said apparatus comprising:

a cleaning member for contacting and cleaning the discharge surface of the ink jet recording means which ejects an acid or alkaline aqueous composition, said cleaning member being comprised of a polyether urethane rubber having units of (a) a polyether urethane prepolymer comprised of moieties of polyoxyalkyline glycol and polyisocyanate and (b) a hardening agent comprising a mixture of a first compound selected from the group consisting of 1,4-butanediol, 1,6-hexanediol, ethyleneglycol, propyleneglycol, polyethyleneglycol, hydroquinonethylolether, bisphenol A and mixtures thereof and a second compound selected from the group consisting of trimethylolpropane, trimethylolethane and mixtures thereof, wherein said polyether urethane rubber has a hardness of JIS A 35–80.

2. An ink jet recording apparatus according to claim 1, wherein said ink composition has a pH of 5 to 9.

3. An ink jet recording apparatus according to claim 1, wherein said ink jet recording means is an ink jet recording head, which discharges ink from the discharging surface by the use of thermal energy, and has an electrothermal converter as means for generating the thermal energy.

4. An ink jet recording apparatus according to claim 1, wherein said ink is an aqueous color ink.

5. An ink jet recording apparatus according to claim 1, further comprising conveying means for conveying said recording medium.

6. An ink jet recording apparatus according to claim 1, which is an on-demand ink jet recording apparatus.

7. An ink jet recording apparatus according to claim 1, which is a continuous ink jet recording apparatus.

8. An ink jet recording apparatus according to claim 1, wherein said ink jet recording means is a full-line recording head.

9. An ink jet recording apparatus according to claim 1, wherein said ink jet recording means is an ink jet recording head wherein film boiling occurs on a thermoactive plane of the recording head and a bubble is formed in the ink.

10. An ink jet recording apparatus according to claim 1, wherein said first compound is 1,4-butanediol.

11. An ink jet recording apparatus according to claim 1, wherein said second compound is trimethylolpropane.

* * * * *

UNITED STATES PATENT AND TRADEMARK OFFICE
CERTIFICATE OF CORRECTION

PATENT NO. : 5,729,258

DATED : March 17, 1998

INVENTOR(S): MASAHIRO WATABE, ET AL.

It is certified that error appears in the above-identified patent and that said Letters Patent is hereby corrected as shown below:

COLUMN 1:

Line 22, "droplet," should read --droplets,--.

COLUMN 2:

Line 5, "recording" should read --recording,--;
Line 18, "progress" should read --progresses--; and
Line 32," antifriction-ability" should read --antifriction ability--.

COLUMN 3:

Line 64, "wet" should read --wetness--.

COLUMN 4:

Line 2, "key board" should read --a keyboard--;
Line 56, "(.not" should read --(not--; and
Line 59, "form" should read --from--.

UNITED STATES PATENT AND TRADEMARK OFFICE
CERTIFICATE OF CORRECTION

PATENT NO. : 5,729,258

DATED : March 17, 1998

INVENTOR(S) : MASAHIRO WATABE, ET AL.

It is certified that error appears in the above-identified patent and that said Letters Patent is hereby corrected as shown below:

COLUMN 8:

Line 55, "responsivility" should read --responsivity--.

Signed and Sealed this

Thirteenth Day of April, 1999

Attest:

Q. TODD DICKINSON

Attesting Officer

Acting Commissioner of Patents and Trademarks